UNITED STATES PATENT OFFICE.

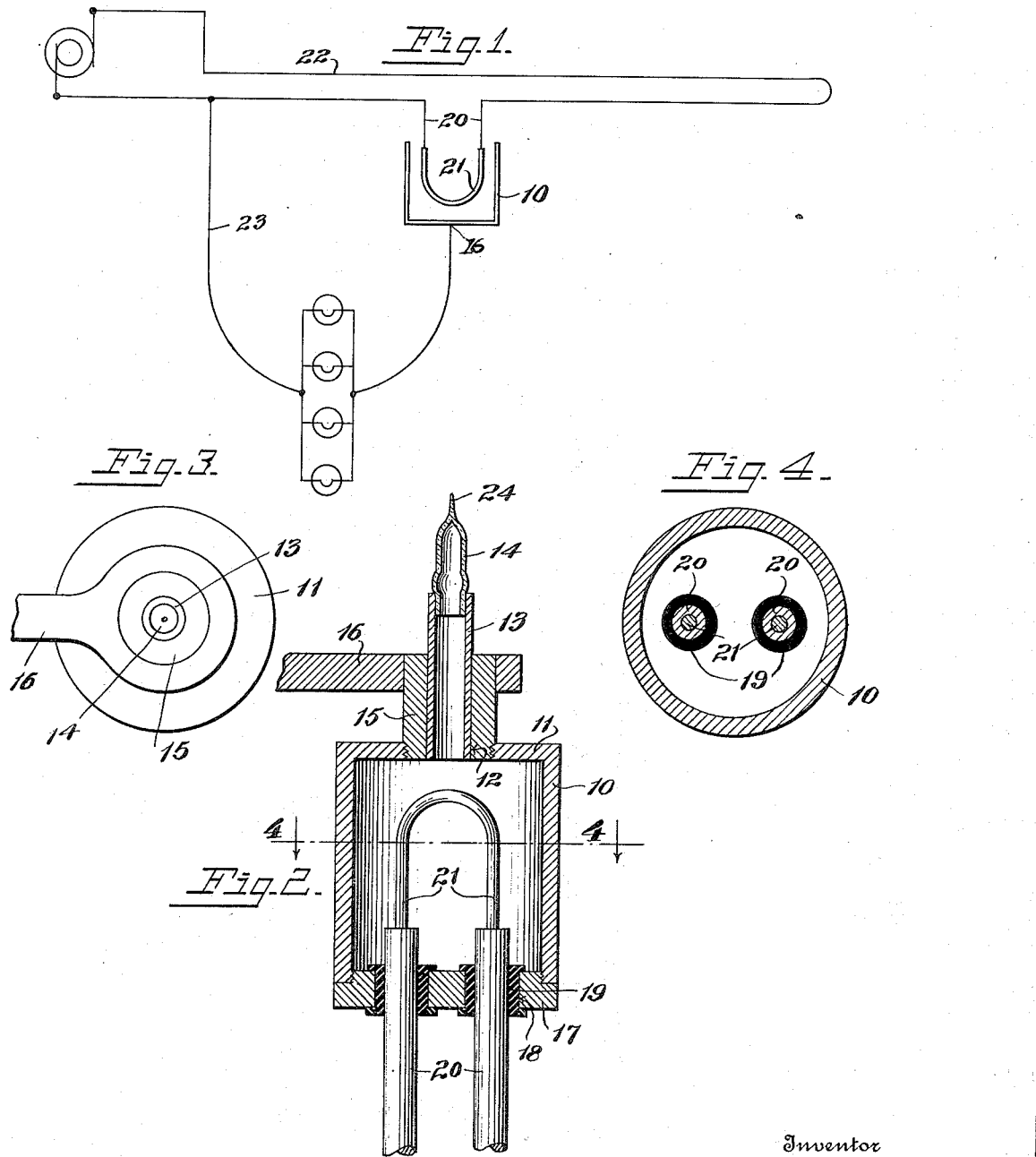

OWEN W. RICHARDSON, OF PRINCETON, NEW JERSEY.

DEVICE FOR THE RECTIFICATION OF ALTERNATING ELECTRIC CURRENTS.

1,189,738.   Specification of Letters Patent.   Patented July 4, 1916.

Application filed June 5, 1913. Serial No. 771,949.

*To all whom it may concern:*

Be it known that I, OWEN W. RICHARDSON, a subject of the King of England, residing at Princeton, in the county of Mercer, State of New Jersey, have invented certain new and useful Improvements in Devices for the Rectification of Alternating Electric Currents; and I do hereby declare the following to be a full, clear, and exact description of the invention, such as will enable others skilled in the art to which it appertains to make and use the same.

This invention relates to rectifiers for electric currents such as are used for the conversion of alternating electric currents into direct currents.

It is well understood that an incandescent body emits large quantities of negative electrons and that the space surrounding a sufficiently heated body of this description possesses extremely high electric conductivity and will only admit the passage of an electric current in the direction toward the incandescent body.

The principal object of this invention is to provide an improved apparatus arranged to utilize these properties in the conversion of an alternating current to a direct current. In carrying out this object different arrangements of apparatus may be used, one of which is shown in the accompanying drawings and hereinafter described. However, it is not desired to confine the scope of the invention to the exact form shown in the drawing and described specifically but it is wished to include all forms which may come within the scope of the appended claim.

In the accompanying drawings, like characters of reference indicate like parts in the several views, and Figure 1 is a diagrammatic view showing the general arrangement of a device of this character. Fig. 2 is a vertical median section through a rectifier showing one embodiment of the invention. Fig. 3 is a plan view of such a rectifier. Fig. 4 is a section on the line 4—4 of such a rectifier.

In carrying out the present embodiment of the invention there is provided a cylindrical metal casing 10. This casing is provided with a top 11 having a centrally disposed opening 12 therein, and in this opening is a metallic tube 13 to the upper end of which is cemented or otherwise hermetically sealed a glass tube 14. Surrounding the tube or neck 13 is a metallic collar 15 to which is secured a lead 16 hereinafter called the direct current lead. Hermetically fitted to the bottom of the casing 10 is a metallic plate 17 having spaced openings 18 therein and in these openings are collars 19 of insulating material. Through these collars extend the leads 20 which are arranged for connection in an alternating circuit and are hereinafter referred to as alternating current leads. These leads are of heavy conducting material such as copper rods and the upper ends of the leads are connected by a U-shaped wire, rod or strip 21 of some refractory conducting material possessing sufficient electrical resistance while at the same time it has but little or no volatility. For these rods such material as carbon or one of the highly refractory metals such as tungsten or osmium may be used and the same may be covered with lime or other compounds. In fact any substance or combination of substances possessing the required attributes of refractoriness, electronic emissivity, stability, conductivity and non-volatility may be employed. In some cases the electronic emissivity is increased by a covering of lime or similar substance, although a rod of lime alone could not work.

In the device shown in the drawings the refractory body is heated by the alternating current. This is the simpliest and most convenient method of heating but this restriction is not essential. The heating may be brought about in any suitable manner but it is essential that some point of the alternating circuit should be in electrical connection with the heated body. In making the connections as shown in Fig. 1 it is convenient to connect the casing to one point of the alternating current line the line being indicated at 22 and the connection from the casing indicated at 23.

In operation the metallic casing acts as an electrode and the best results are found to be obtained when this electrode envelops the body 21 as in the apparatus set forth and illustrated. The current passing through the body 21 heats the same to a high degree of incandescence and the space surrounding the body becomes highly conductive. At the same time current cannot flow from the body to the electrode formed by the casing 10 so that the current passing through the conductor 23 can flow but in one direction and the alternating current is thus rectified. The lead 16 is connected to the direct current circuit 23 and a positive wave of current passes directly through the electrode 21 for heating it, and partly through the direct current circuit 23 to lead 16, and casing 10, through the highly conductive atmosphere of the interior of the casing 10, to one of the leads 20, and thence to the other pole of the alternating current source. The resistivity of the loop 21, will be so high compared with that of the series connection, that the loop is raised to incandescence by the alternating current, while the temperature of the connection is only slightly affected thereby. In order that chemical action may be eliminated within the casing 10 it is preferable either to exhaust this casing through the tube 14 and then seal said tube off as at 24 thus producing a vacuum within the casing or the air may be drawn out of the casing and a suitable quantity of some neutral gas, such as hydrogen or the like be admitted within the casing. This will prevent the combination of the elements or element of the body 21 with the surrounding gas and thus eliminate the destruction of the body. Evacuation facilitates the passage of the rectified current and is therefore in general preferable to the admission of neutral gas.

Having thus described the invention, what is claimed as new, is:—

In a current rectifier, a cylindrical metallic casing having a reduced neck extending therefrom to permit connection to an exhaust pump, a bottom for said casing having spaced openings therein, insulating sleeves held in said openings, current leads extending through said sleeves, said casing, sleeves, bottom and leads being arranged to form an air tight structure, a rod, wire or strip of substantially non-volatile material having sufficient electrical resistance connected at its ends to the inner ends of said leads.

In testimony whereof, I affix my signature, in the presence of two witnesses.

OWEN W. RICHARDSON.

Witnesses:
   E. C. CRITCHLOW,
   K. B. TITUS.